Sept. 22, 1925.
W. J. STRATTON
1,554,467
MECHANICAL BAR CHART
Filed Oct. 23, 1924     3 Sheets-Sheet 1
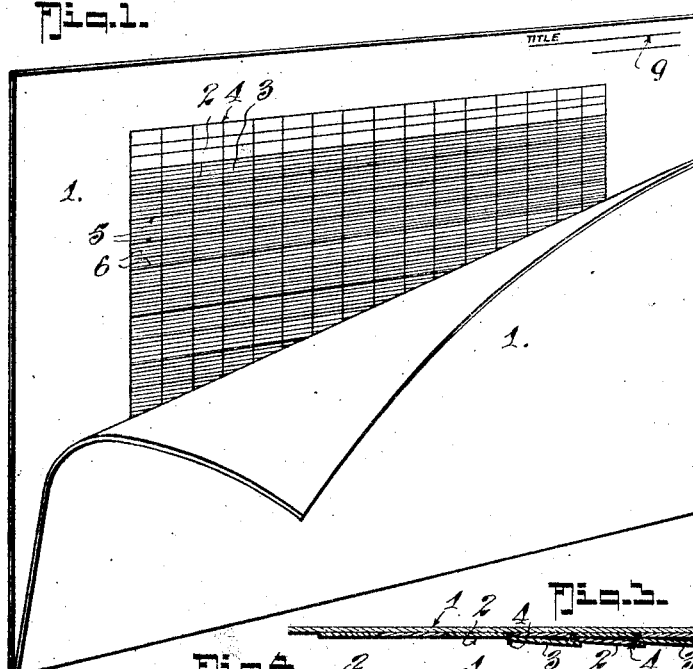
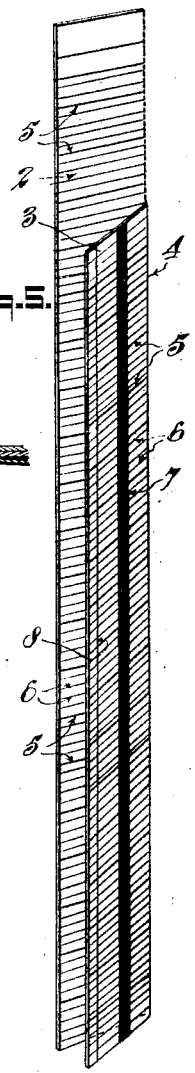
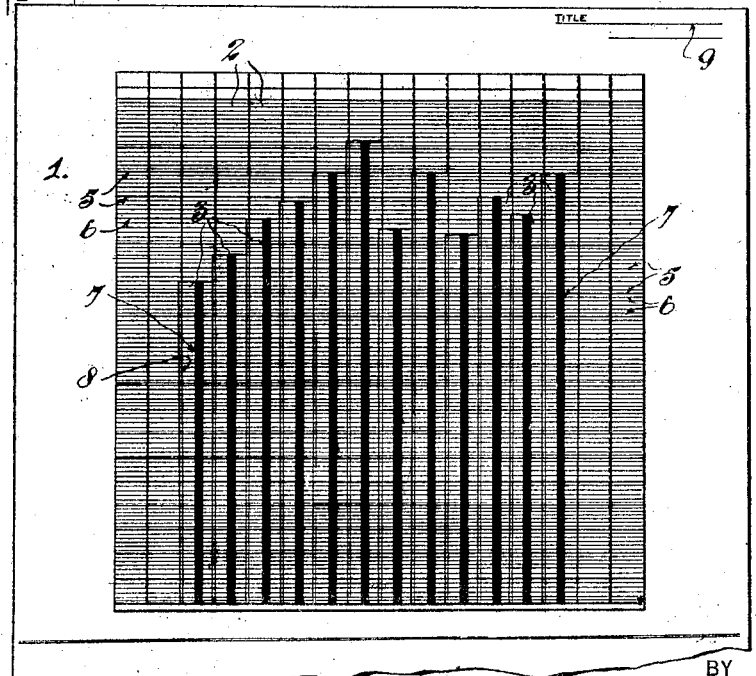
INVENTOR
W. J. STRATTON.
BY
Albert E Dietrich
ATTORNEYS Sept. 22, 1925.
W. J. STRATTON
1,554,467
MECHANICAL BAR CHART
Filed Oct. 23, 1924     3 Sheets-Sheet 2
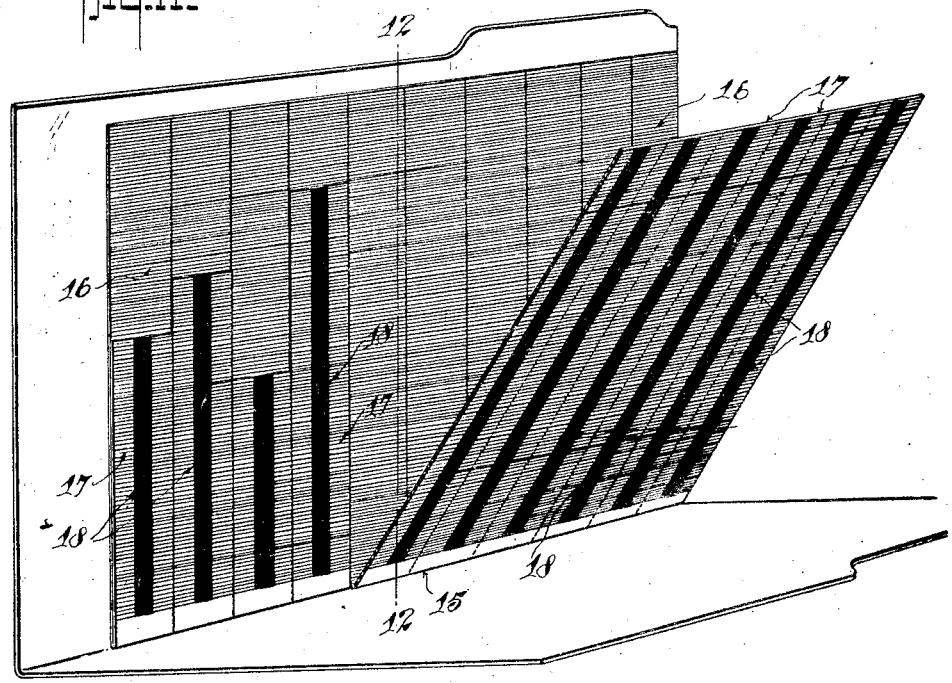
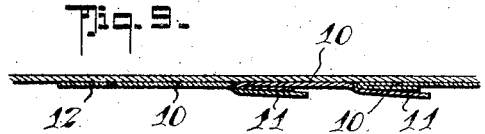
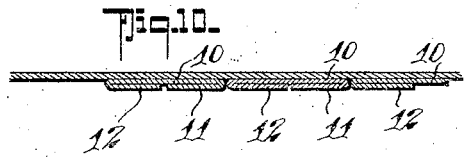
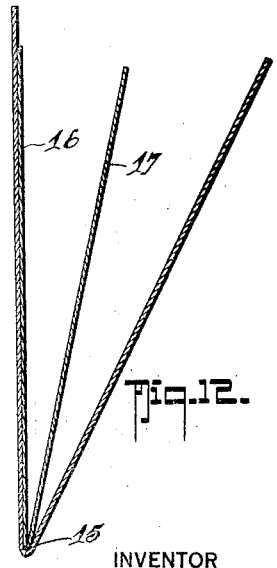
INVENTOR
W. J. STRATTON
BY
ATTORNEYS Sept. 22, 1925.

W. J. STRATTON

MECHANICAL BAR CHART

Filed Oct. 23, 1924

INVENTOR
W. J. STRATTON
BY
ATTORNEY

Patented Sept. 22, 1925.

1,554,467

UNITED STATES PATENT OFFICE.

WILLIAM J. STRATTON, OF WALLACE, IDAHO.

MECHANICAL BAR CHART.

Application filed October 23, 1924. Serial No. 745,471.

*To all whom it may concern:*

Be it known that I, WILLIAM J. STRATTON, a citizen of the United States, residing at Wallace, in the county of Shoshone, in the State of Idaho, have invented a new and useful Mechanical Bar Chart, of which the following is a specification.

The invention relates to the art of preparing exhibits in graphic chart form and generally resides in the provision of a mechanical bar chart for that purpose.

In the art of preparing such exhibits many different forms of charts are used and whereupon the fluctuations of value, quantity of production, or other desired statistics are graphically exhibited by curves, circles, point to point lines, bars or otherwise according to the knowledge and whims of the individual whose duty it is to prepare such charts.

The most simple form of such chart, for ordinary business purposes, is the common bar chart wherein the fluctuation is graphically illustrated by value or quantity indicating lines drawn to the length desired to indicate the particular value or amount. With this form of chart the present invention is concerned.

In preparing the common type of exhibit in graphic chart form, a scale is arrived at that will take in the minimum and maximum of the values or quantities to be depicted by the exhibit, lines are then ruled to fit such scale, and, in case of the bar type of chart, the bars are then drawn to the lengths necessary to indicate the desired value or quantity. This is very slow and tedious work and must be done with great care, or the exhibit will not only be incorrect but will look very unattractive. Obviously such work cannot be done with the necessary degree of accuracy or neatness unless the party is skilled as a draftsman, thus making the preparations of such exhibits an expensive system, due to the time consumed and the duplication of employees made necessary by the present methods of preparing such charts.

Therefore, it is the object of this invention to provide a mechanical bar chart which is capable of being used and of being prepared for use as a graphic exhibit of quantities or values without the necessity of any lines whatever being drawn by the individual or individuals preparing or compiling the said chart.

It is a further object of the invention to provide a chart of the character stated which is so simple of construction and of operation that it may be used by anyone, whether he has skill as a draftsman or not, thus eliminating the necessity of employing high priced employees and making it possible for the party having charge of collecting and recording such data to prepare the charts himself with the result of time saving and also the elimination of many possibilities of error.

More specifically it is the object of the present invention to provide another embodiment of the generic invention disclosed in my application filed November 22, 1923, Serial No. 676,450, an embodiment in which the individual bar units are arranged permanently in a folder or on a suitable backing in such a way as to produce a permanent record that can be filed away as a complete unit and eliminate danger of disarranging the units of the record.

In its general nature the present invention comprises a structure in which is pasted or otherwise suitably secured a series of individual bar units, arranged side by side with their horizontal lines and spaces in register, each unit comprising column-like sections, at least one of which has an indicating bar extending substantially its full length, the sections being adapted for separation, the section or sections having the bars being adapted to be cut off or shortened to accord with the bar-value desired; the unit section having no bar is the one pasted to the backing in such manner that a bar section of one unit will over-lie the secured section of the next unit at times, the bar sections being foldable back upon the respective secured section to expose the bars at other times and being adapted to be pasted or otherwise secured to the secured section with the bar exposed when desired.

More subordinately the invention also resides in those novel features of construction, combination and arrangement of parts, all of which will be first fully described and then be specifically pointed out in the appended claims, reference being had to the accompanying drawings, in which:

Figure 1 is a perspective view of one embodiment of my invention before the "chart" has been used.

Figure 2 is a face view of the invention with the chart made up.

Figure 3 is an enlarged detail plan or edge view of a portion of Figure 1 showing the manner in which the unsecured or bar sections overlie the secured sections of the units.

Figure 4 is a view similar to Figure 3 after the chart has been made up as shown in Figure 2.

Figure 5 is a detail perspective view of a single bar unit, per se.

Figure 9 is a detail horizontal section on the line 9—9 of Figure 6.

Figure 10 is a detail horizontal section on the line 10—10 of Figure 7.

Figure 11 is a perspective view of another embodiment in which the strip units have their sections united at the bottom instead of along their longitudinal edges.

Figure 12 is a vertical section on approximately the line 12—12 of Figure 11.

In the drawing like numerals of reference indicate like parts in all of the figures.

Figure 6:
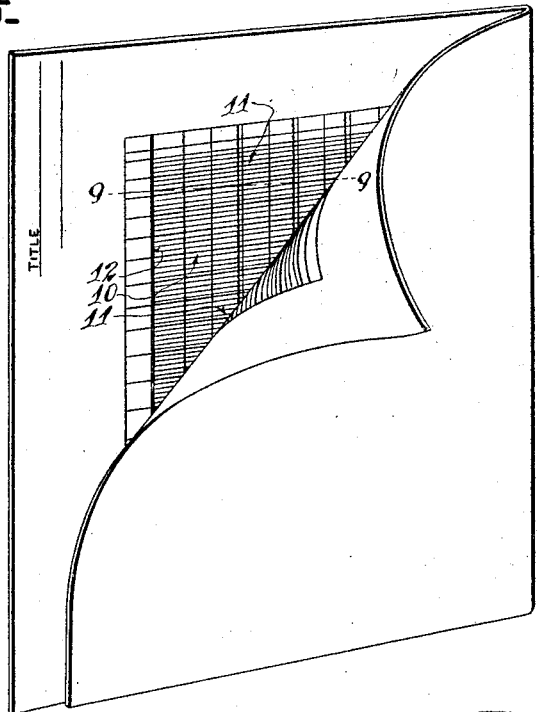
Figure 6 is a perspective view of another embodiment of the invention adapted for the showing of ratios.

In my present invention, the several strip units may all be printed together in a master sheet and separated therefrom for use in making up the present chart somewhat in the manner indicated in my copending application aforesaid, but as the manner of producing the individual strip blanks is not a part of the present invention, the way in which those units are prepared (whether individually or in a master sheet) is not material here.

In carrying out the first shown embodiment of my present invention I provide a suitable backing 1 which may be a filing folder, (Figures 1 to 5 inclusive) to which the individual bar units are permanently secured in a manner soon to be explained.

Each bar unit comprises two vertical column sections 2 and 3 divided by a vertical separation "line" or fold 4 which may be, and preferably is, perforated for convenience of separation. Both sides of each unit are ruled with suitably spaced major horizontal lines 5, the spaces between which may again be sub-divided by parallel lines 6, as shown.

One piece of each section 3 is provided with a vertical indicator bar that extends substantially the entire length of the section and near the outer edge with a vertical column-line 8 paralleling the bar 7. (This line 8, however, may be omitted, if desired.)

The several units are mounted on the folder 1 by pasting or otherwise securing the sections 2 thereto in juxtaposition with their vertical lines parallel and their horizontal lines registering, the mounting being such that the bar faces of the sections 3 will overlie the blank faces of the sections 2 of the next adjacent units whereby, before using, all bars 7 may be covered from view (see Figure 1). The securing may be accomplished in any desired way as, for instance, by pasting the sections 2 to the folder 1 and leaving the bar carrying sections 3 of the units free to be folded back upon the respective sections 2.

In preparing the chart to indicate the desired data, the bar carrying strips 3 are cut down from the top to leave the bars of the heights desired and the cut down portions are severed from the sections 2 and thrown away. In this way, the several bars are left of lengths to indicate the particular values desired on the respective units. After this is done, the remainder of the sections 3 may be pasted down to the respective sections 2 of the units, thus permanently exposing the bars and constituting a graphic chart record (see Figure 2).

By making the sections 3 slightly wider than the sections 2 and providing the column lines 8 in position to register with the lines of separation 4 when the sections 3 are folded over, clearly defined vertical columns will be produced in the finished chart (Figure 2) which may facilitate reading, although if desired the lines 8 may be omitted since the fold-over or separation lines 4, exposed above the bar tops, can serve as column-dividers, if desired.

The folder or backing 1 may have suitable lines and spaces and indicating data 9 for filing purposes, if desired.

Figure 8:
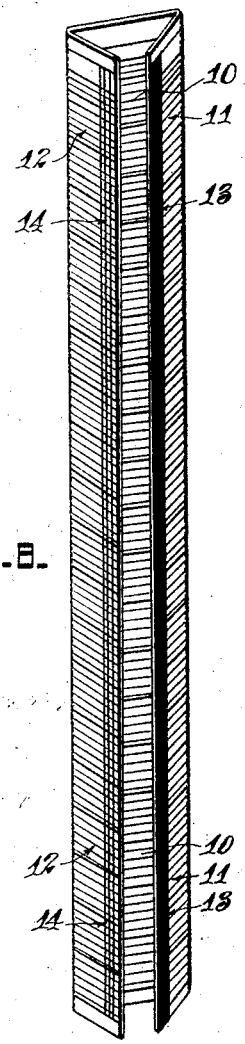
Figure 8 is a detail perspective view of one strip unit employed in the embodiment shown in Figures 6 and 7.
Figure 7:
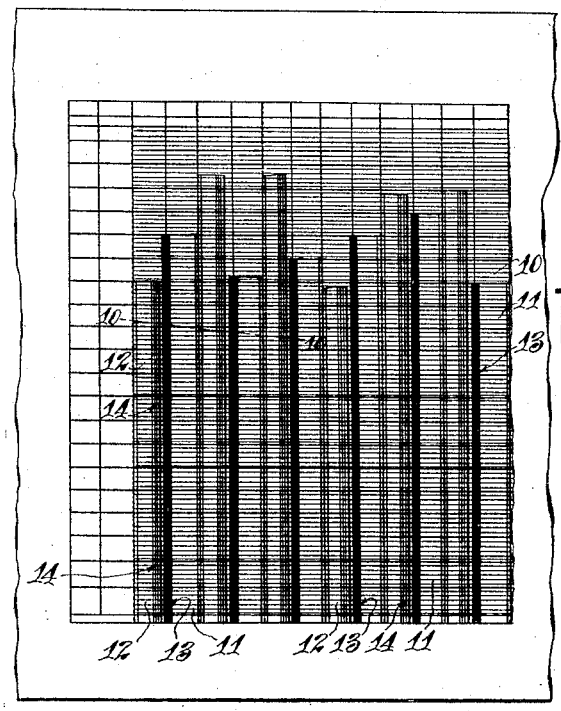
Figure 7 is a view similar to Figure 2 of the embodiment shown in Figure 6.

In Figures 6 to 8 inclusive I have shown another embodiment of my invention which is especially designed for showing two ratios. By reference to these figures it will be noted that the strip unit comprises a central section 10 of a double column width and two side sections 11 and 12 respectively. The central section 10 is pasted to the folder when made up in the form of a folder and both faces of the sections are ruled with horizontal lines indicating values, the section 11 being provided with the vertical indicator bar preferably in the form of a solid bar. The other section 12 has an indicator bar 14 of another density or of a distinguishing appearance from the bar 13 so that, as shown in Figure 7, when the sections 11 and 12 are folded over the values of the indicator bars 13 and 14 adjacent one another will give the ratio of that particular unit. One bar can be used for example to indicate expenses and the other to indicate income for the period the unit represents, thus showing at a glance not only the ratio between expenses and income for any particular period, but giving the expenses and income curves for the desired interval of time for which the chart is made up.

Instead of having the bar sections united on vertical folding lines as shown in Figures 1 to 10 inclusive, they may be united on a horizontal line 15 as shown in Figures 11 and 12 for example. In this figure 16 represents the section of the unit which is pasted or secured to the folder and 17 the section of the unit which is adapted to be torn off or severed to indicate the bar value. 18 designating the indicator bar of the particular unit.

Other modifications of the invention may be made without departing from the spirit of the invention or the scope of the appended claims.

From the foregoing description, taken in connection with the accompanying drawings, it is thought the construction, operation uses and advantages of my invention will be readily understood by those skilled in the art.

What I claim is:

1. In bar charts, a backing, a plurality of strip units each having horizontal divisions at like points on their front and back faces, each said units comprising two sections foldable over on a longitudinal separation line face to face, one face of the unit having an indicating bar on one of its sections and having the corresponding face of its other section secured to the backing, the bar-face section of a unit adapted to overlie the secured section of the next adjacent unit during inoperative position to hide the bar from view.

2. In bar charts, a backing, a plurality of strip units each having horizontal divisions at like points on their front and back faces, each said units comprising two sections foldable over on a longitudinal separation line face to face, one face of the unit having an indicating bar on one of its sections and having the corresponding face of its other section secured to the backing, the bar-face section of a unit adapted to overlie the secured section of the next adjacent unit during inoperative position to hide the bar from view, the bar face section of a unit being adapted to be folded back over its respective secured section to expose the bar during operative position and adapted to be horizontally severed to regulate the length of the indicating bar.

3. In bar charts, a backing, a plurality of strip units each having horizontal divisions at like points on their front and back faces, each said units comprising two sections folded over on a longitudinal separation line, one of said sections having an indicating bar on one face, the corresponding face of the other section being secured to the backing, the section having the indicating bar adapted to be folded over onto the secured section to expose the indicating bar and adapted to be horizontally severed to regulate the length of the indicating bar, and means securing the remaining portion of the bar section to its respective secured section to permanently expose the bar.

4. In bar charts, a backing, a plurality of strip units each having horizontal divisions at like points on their front and back faces, each said units comprising two sections folded over on a longitudinal separation line, one of said sections having an indicating bar on one face, the corresponding face of the other section being secured to the backing, the section having the indicating bar adapted to be folded over onto the secured section to expose the indicating bar and adapted to be horizontally severed to regulate the length of the indicating bar, means securing the remaining portion of the bar section to its respective secured section to permanently expose the bar, said bar section of the units having vertical column-lines paralleling the bars and adapted when the bar section is secured in the permanent position to register with the line of separation of the adjacent section and constitute column dividers.

5. In bar charts, a folder constituting a backing, a plurality of strip units each having horizontal divisions at like points on at least one face, each said units comprising two sections folded over on a longitudinal separation line face to face, the face of the unit having the horizontal divisions also having an indicating bar on one of its sections and having the corresponding face of its other section secured to the backing, the bar-face section of a unit adapted to overlie the secured section of the next adjacent unit during inoperative position to hide the bar from view.

6. In bar charts, a backing, a plurality of strip units each having horizontal divisions at like points on their front and back faces, each unit comprising at least two sections foldable over face to face, one face of the unit having an indicator bar at least on one of its sections and having the corresponding face of another of its sections secured to the backing, the section having the bar of a unit adapted to overlie the secured section to expose the indicator bar to view.

7. In bar charts, a folder constituting a backing, a plurality of strip units each having horizontal divisions at like points on their front and back faces, each of said units comprising a section adapted to be secured to the backing, and at least one other section foldable over onto the secured section, said other section having an indicating bar on one face adapted to be exposed when that section is folded over onto the secured section, the section having the indicator bar adapted to lie over the face of another adjacent unit when the bar is hidden from view.

8. In bar charts, a strip unit comprising three sections, a central section, and two other sections foldable over onto the central section, one face of the central section having horizontally ruled lines and spaces, one face of each of the other two sections having horizontally ruled lines and spaces corresponding to those of the central sections and also having a longitudinal indicator bar, the indicator bar of one of said other sections being of different appearance from that of the remaining section, all being arranged whereby when said other sections are folded over the central section to expose the indicator bars, the indicator bars will lie parallel and adjacent, said other sections adapted to have portions removed to give value to the indicator bars for the purpose described.

WILLIAM J. STRATTON.